United States Patent
James et al.

(10) Patent No.: US 7,347,983 B2
(45) Date of Patent: Mar. 25, 2008

(54) MG2MM'O 6+X, (M=Y, RARE EARTH METAL AND M'=SN, OR ZR) DIELECTRIC CERAMICS

(75) Inventors: Jose James, Kerala (IN); Selvaraj Senthilkumar, Kerala (IN); Kallumelthekethil Vasudevan Pillaj Oonnikrishnan Nair, Kerala (IN)

(73) Assignee: Council of Scientific & Industrial Research, New Delhi (IN)

( * ) Notice: Subject to any disclaimer, the term of this patent is extended or adjusted under 35 U.S.C. 154(b) by 522 days.

(21) Appl. No.: 10/403,431

(22) Filed: Mar. 31, 2003

(65) Prior Publication Data

US 2005/0013758 A1 Jan. 20, 2005

(51) Int. Cl.
*C01F 5/00* (2006.01)
*C01F 1/00* (2006.01)

(52) U.S. Cl. ............... 423/592.1; 423/155; 423/21.1; 423/608; 423/617; 423/635; 423/89; 423/87; 423/69; 423/62; 423/618; 423/594.17; 423/263; 423/593.1; 423/594.16; 501/135

(58) Field of Classification Search ........ 501/135; 423/155, 21.1, 592.1, 608, 617, 635, 89, 423/87, 69, 62, 618, 594.17, 263, 593.1, 423/594.16

See application file for complete search history.

(56) References Cited

U.S. PATENT DOCUMENTS

| | | | | |
|---|---|---|---|---|
| 4,054,532 A | * | 10/1977 | Hanke et al. | 501/134 |
| 5,015,461 A | * | 5/1991 | Jacobson et al. | 423/594.8 |
| 5,993,947 A | * | 11/1999 | Cava et al. | 428/210 |
| 6,761,866 B1 | * | 7/2004 | James et al. | 423/335 |
| 6,835,367 B2 | * | 12/2004 | James et al. | 423/593.1 |

OTHER PUBLICATIONS

The English abstract of the article titled "Compound Mg2Ta2O7 and its interaction with Nd3TaO7" published in "Refractories and Industrial Ceramics" (2002), 43(5-6), pp. 172-175.*

Koshy et al., "Novel Ceramic Substrates for High Tc Superconductors", *Bull Mater., Sci.*, vol. 22, No. 3, pp. 243-249, (May 1999).

Koteswara Rao et al., "Preparation and Characterization of Bulk and Nano Particles of $La_2Zr_2O_2$ and $Nd_2Zr2O_2$ by Sol-Gel Method," *Materials Letters*, 54, pp. 205-210, (2002).

X.L. Li et al., "Synthesis, Crystal Structure, and Magnetic Property of $Sm_{2-x}Co_xTi_{2-x}NB_xO_7$ (x=0, 0.2, 0.4)", *Materials Chemistry & Physics*, 77, pp. 625-631, (2002).

S. Ya Istomin et al., "Synthesis & Characterization of Reduced Niobates . . . ", *Materials Research Bulletin*, vol. 32, No. 4, pp. 421-430, (1997).

Holtappels et al., "Electrical Conductivities and Chemical Stabilities of Mixed Conducting Pyrochlores for SOFC Applications", *Solid State Ionics*, vol. 135, pp. 675-679, (2000).

Zhigang Zou et al., "Preparation, Structural & Optical Properties of a New Class of Compounds", $Bi_2MNbO_7$ (M=Al, Ga, In), Materials Science & Engineering B79, pp. 83-85, (2001).

M. Valant, "Synthesis & Dielectric Properties of Pyrochlore Solid Solutions in the $Bi_2O_3$-Zno-$Nb_2O_5$-$TiO_2$ System", *Journal of Materials Science*, 34, pp. 5437-5442 (1999).

Michael M.A. Sekar, "Low Temperature Synthesis & Properties of Microwave Resonator Materials", *Materials Science & Engineering B38*, pp. 273-279, (1996).

* cited by examiner

*Primary Examiner*—Timothy C. Vanoy
(74) *Attorney, Agent, or Firm*—Abelman, Frayne & Schwab (57) ABSTRACT

Complex ceramic oxides of the general formula $Mg_2MM'O_{6+x}$ where M=Rare metal ion or Yttrium or Lanthanum and M'=Sn, Sb, Zr, Hf, Ta, and Nb; and where $-0.5<x<0.5$; having a defective pyrochlore structure are useful for active and passive electronic applications, as dielectrics, catalyst sensors, hosts for radioactive waste, etc. This process for the preparation of this class of compounds comprises: (i) mixing the compounds of magnesium, M and M' to get the molar ratio as 2:1:1 (ii) the mixture obtained in step (i) along with a wetting medium may be ball milled or mixed; (iii) the resultant slurry may be dried to obtain dry powder, (iv) the resultant mixture may be heated to a temperature in the range of 1000-1600° C. for the duration ranging from 3 hours to 50 hours, either in a single step or by taking out the reactant after heating, checking for the structure formation and heating again after grinding, if necessary.

36 Claims, 12 Drawing Sheets

Fig-1: XRD of $Mg_2SmTaO_6$ (a) Obtained by heating the precursor at 500°C
(b) Obtained by heating the powder at 1000°C Fig-2: Variation of dielectric constant with Log (Frequency) of sintered $Mg_2SmTaO_6$ Fig-3: Variation of Dielectric loss with Log (frequency) of sintered $Mg_2SmTaO_6$ Fig-4: XRD of $Mg_2LaSnO_{5.5}$ (a) Obtained by heating the precursor at 500°C
(b) Obtained by heating the powder at 1000°C Fig-5: Variation of Dielectric constant with Log(Frequency) of $Mg_2LaSnO_{5.5}$ Fig-6: Variation of Dielectric loss with Log(Frequency) of sintered $Mg_2LaSnO_{5.5}$ Fig – 7: XRD of $Mg_2DySbO_6$
(a) Obtained by heating the precursor at 500°C
(b) Obtained by heating the powder at 1000°C Fig-8: Variation of Dielectric constant with Log(Frequency) of sintered $Mg_2DySbO_6$ Fig-9: Variation of Dielectric loss with Log(Frequency) of sintered $Mg_2SmZrO_{5.5}$ Fig-10: XRD of $Mg_2NdZrO_6$ (a) Obtained by heating the precursor at 500°C
(b) Obtained by heating the powder at 1000°C Fig-11: Variation of Dielectric constant with Log(Frequency) of sintered $Mg_2NdZrO_6$ Fig-12: Variation of Dielectric loss with Log(Frequency) of sintered $Mg_2NdZrO_6$

MG2MM'O 6+X, (M=Y, RARE EARTH METAL AND M'=SN, OR ZR) DIELECTRIC CERAMICS

This invention relates to a new group of complex ceramic oxides and a process for their production. This invention particularly relates to novel complex ceramic oxides of the general formula $Mg_2MM'O_{6+x}$, where M=rare earth metal ion or Y and M'=Sn, Sb, Zr, Hf, Ta, and Nb; having a defect pyrochlore structure and the solid state reaction method of their preparation. The complex ceramic powders of the present invention are useful for active and passive electronic applications, for temperature stable, low loss, high permitivity dielectric applications, for temperature stable and temperature compensating dielectrics; microwave dielectrics and as co-fired microwave components, for electrodes of Fuel cells, as catalyst (solid photocatalysts, oxidation catalysts), as gas monitoring sensors, as possible host for radioactive wastes and as host for fluorescence centers.

Introduction

In recent years, there has been a raising order of interest in the preparation and characterization of complex ceramic oxides, with the general formula $A_2MM'O_{6+x}$; where A=Ba, Sr and Ca; M=Y and rare earths and M'=Sb, Sn, Nb, Zr, Hf and Ta. The compounds with general formula $Ba_2MM'O_{6+x}$ crystallize in the perovskite structure. Some of the compounds with the formula $Sr_2MM'O_{6+x}$ are also reported. They also possess the perovskite structure. Some of the compounds reported in these system are; $Sr_2GaNbO_6$, $Sr_2GaTaO_6$, $Sr_2AlNbO_6$, $Sr_2AlTaO_6$, $Ca_2GaNbO_6$, $Ca_2GaTaO_6$, $Ca_2AlNbO_6$, $Ca_2AlTaO_6$, $Ba_2DySnO_{5.5}$, $Ba_2EuNbO_6$, $Ba_2ErSbO_6$, $YBa_2NbO_6$, $Ba_2DySbO_6$ $Ba_2PrHfO_{5.5}$ (J Koshy, K S Kumar, J Kurian Y P Yadava and A D Damodaran; Rare-earth barium Stannates: Synthesis, characterization and potential use as substrate for $YBa_2Cu_3O_{7-n}$; Journal of American Ceramic Society; 78[11] 5088-92 (1995); and C D Bradle and V J Fratello; preparation of perovskite oxides for high Tc superconductor substrates; Journal of Materials Research, volume-5, Number-10 pages 2160-2164 year 1990). These compounds were prepared by the conventional solid state reaction technique or by using an exothermic combustion of a polymeric precursor at a relatively low temperature. (J Koshy, J Kurian, R Jose, A M John, P K Sajith, J James, S P Pai and R Pinto; Bulletin of Material Science, Volume-22, Number-3 May 1999 pages 243-249; A M John, R Jose and J Koshy; Synthesis and rapid densification of nanoparticles of Barium Praseodymium Hafnium Oxide: a complex perovskite; Journal of Nanoparticle research, volume-3 year 2001 pages-413-417). However in case of $Ca_2MM'O_{6+x}$ compounds apart from the perovskite structure, a few cases of meta stable pyrochlore structures were also reported. These meta stable pyrochlores transformed into perovskite structures at about 650-700° C. (J Koshy, J Kurian, R Jose, Asha M John, P K Sajith, J James, S P Pai and R Pinto "Novel ceramic substrate for high Tc superconductors" Bulletin of Material Science, vol. 22, pp 243-249 (1999); S Ya Istomin, O G D'yachenko and E V Antipov, Synthesis and characterization of reduced niobates $CaLnNb_2O_7$. Ln=Y, Nd with pyrochlore structure; Materials Research Bulletin, vol. 32, No. 4, pp 421-30, (1997); J Koshy, J Kurian, P K Sajith, K S Kumar, R Jose, Asha M John and A D Damodaran; Novel ceramic substrate for Bi-cuperate superconductors; U.S. Pat. No. 5,741,747 dated April 21, (1998)). Some of the magnesium bearing ceramic oxides reported for possible use in electronic ceramic applications are $Sr_2MgMoO_6$, $La_2MgTiO_6$, $Gd_2MgTiO_6$, $Gd_2MgZrO_6$ and $La_2MgGeO_6$, (C D Bradle and V J Fratello, preparation of perovskite oxides for high Tc superconductor substrates; Journal of Materials Research, volume-5, Number-10 pages-2160-2164 year 1990). Most of the above mentioned compounds had a perovskite structure. However some of the Magnesium bearing compounds that were reported are $Ba(Mg_{1/3}Ta_{2/3})O_3$ and $PbMg_{1/3}Nb_{2/3}O_3$ and $Bi_2M'_{2/3}M''_{4/3}O_7$ where M'=Zn, Mg, Ni, Sc, In and Cu and M''=Nb and Ta (M Valant and P K Davis; Synthesis and dielectric properties of pyrochlore solid solutions in the $Bi_2O_3$—ZnO—$Nb_2O_5$—$TiO_2$ system. Journal of Material Science 34(1999) 5437-5442). Some of these magnesium-bearing compounds had pyrochlore structures, However compounds of the type $Mg_2MM'O_{6+x}$, either with perovskite structure or pyrochlore structure were not reported.

Pyrochlore structures are the structures with the general formula $A_2B_2O_7$, where A atoms are 8 coordinated and B atoms are 6 coordinated with one extra O-atom. In recent years many pyrochlore compounds with more complicated composition $(AA')_2(BB')_2O_7$ have been synthesized. For the possibility of existence of any pyrochlore compound, there are two criteria: (1) the ratio of the ionic radius of the cation at the A site to that at the B site must be between 1.46 and 1.80 and (2) the chemical valencies of the various ions must make the compound neutral. (Y Xuan, R Liu and Y Q Jia; Synthesis of a new series of compounds $RE_2Co_{2/3}Nb_{4/3}O_7$ and stability field diagram of $RE_2B_{2/3}'B_{4/3}''O_7$ pyrochlore compounds; Materials Chemistry and Physics, vol-53, pp 256-261 (1998)). Pyrochlore compounds have been extensively studied over the past because of their specific properties and consequent technological applications. Some of the very important properties of members of this group of compounds are: low thermal conductivity, high melting point, high thermal expansion coefficient, high stability. They can be used in Gas turbines and diesel engines as thermal barrier coatings. Some of the pyrochlore compounds exhibit high ionic conductivity and can be used as electrodes for Fuel cells, egs, $Gd_2TiMoO_{7+x}$; $Gd_2TiO_{7+x}$ (P Holtappels, F W Poulsen and M-Mogensen; Electrical conductivities and chemical stabilities of mixed conducting pyrochlores for Solid oxide fuel cell applications; Solid State Ionics, vol. 135, pp 675-679 (2000)). Pyrochlore oxides also exhibit catalytic properties and are used as solid photocatalysts (eg. $Bi_2MNbO_7$, M-Al, Ga, In) (Zhigang Zou, Jinhua Ye and Hironori Arakawa, Preparation, structural and optical properties of a new class of compounds, $Bi_2MNbO_7$ (M=Al, Ga, In); Materials Science and Engineering vol. B79, pp 83-85 (2001)), oxidation catalysts and as gas monitoring sensors. They have the ability to accommodate defects and act as possible host for radioactive wastes, and as host for fluorescence centers. Some of the pyrochlore materials also show superconductivity and magnetic properties, including Colossal Magneto resistant behavior; e.g. $Sm_2Ti_2O_7$, $La_2Zr_2O_7$, $Nd_2Zr_2O_7$, $La_{0.7}Ba_{0.3}Mn_3$, (L Li, Y W Song, H Xiong, Y Q Jia, N Matsushita and Y Xuan; Synthesis, crystal structure and magnetic properties of $Sm_{2-x}Co_xTi_{2-y}Nb_yO_7$ (x=0, 0.2, 0.4); Materials Chemistry and Physics, vol-9273, pp. 1-7 (2002); K Koteswara Rao, Taqveem Banu, M Vital, G Y S K Swarny and K Ravi Kumar; Preparation and characterization of bulk and nanoparticles of $La_2Zr_2O_7$ and $Nd_2Zr_2O_7$ by sol-gel method; Materials letters; vol. 54, pp. 205-210 (2002))

Pyrochlores have been used in active and passive electronic applications. They are recently recognized as potential candidates for temperature stable, low loss, high permitivity dielectric applications and in temperature stable and temperature compensating dielectrics; microwave dielectrics and as co-fired microwave components (P Holtappels, F W Poulsen and M Mogensen; Electrical conductivities and chemical stabilities of mixed conducting pyrochlores for SOFC applications; Solid State Ionics, vol. 135, pp 675-679 (2000)).

However no compound of the formula $Mg_2MM'O_{6+x}$ (where $-0.5<x<+0.5$ and M=Yttrium or Lanthanum or any of the Rare Earth metal ions; and M'=Sb, Sn, Zr, & Ta) has been reported till now.

Objectives

The main objective of the present invention is to provide a novel Magnesium based class of complex ceramic oxides, that could be used (i) for active and passive electronic applications, (ii) for temperature stable, low loss, high permitivity dielectric applications (iii) for temperature stable and temperature compensating dielectrics; microwave dielectrics and as co-fired microwave components (iv) for electrodes for Fuel cells (v) as catalyst (solid photocatalysts, oxidation catalysts) (vi) as gas monitoring sensors, (vii) as possible host for radioactive wastes, and (iii) as host for fluorescence centers.

Another objective of the present invention is to prepare a novel class of complex ceramic oxides having the formula $Mg_2MM'O_{6+x}$ where M=Y, La and rare earth metal ions; and M'=Sb, Sn, Zr, and Ta and having a defect pyrochlore structure.

Yet another objective of the present invention is to provide a method for the preparation of a novel magnesium bearing class of complex ceramic oxides having the above formula, structure and uses.

Invention

We have now prepared a new class of Mg bearing compounds with the general formula $Mg_2MM'O_{6+x}$, (M=Y, La and rare earth metal ions; and M'=Sb, Sn, Zr, and Ta) having a defect pyrochlore structures. Accordingly the invention provides a process for the preparation of the above mentioned class of compounds which comprises:

(i) Mixing the compounds of magnesium, M and M' (where M may be Yttrium, or any of the rare earth metals; and M'=Antimony, Tin, Zirconium or tantalum) in such a way as to get the molar ratio of Mg:M:M' as 2:1:1 required for the formation of the compounds of the general formula $Mg_2MM'O_{6+x}$. Minor variations in the compositions up to 8% in one metal ions may be tolerated for the formation of the required phase.

(ii) The compounds employed in step (i) may be selected from their oxides, carbonates, chlorides, alkoxides, nitrates, sulphates etc.; preferably the salts used are selected from oxides or carbonates.

(iii) The mixture obtained in step (i) may be ball milled or mixed with a wetting medium. The wetting medium may be water, alcohol, acetone or any other organic solvent. The resultant ball milled slurry may be dried to remove the liquid and obtain dry powder.

(iv) Heating the resultant mixture to a temperature in the range 1000-1450° C. as required for different duration ranging from 3 hour to 50 hours, either in a single step or by taking out the reactant after few hours of heating, checking for phase formation and heating it again after grinding if necessary. Up to a maximum of 5 intermediate grindings may be required.

The complex ceramic powders of the present invention are useful (i) for active and passive electronic applications, (ii) for temperature stable, low loss, high permitivity dielectric applications (iii) for temperature stable and temperature compensating dielectrics; microwave dielectrics and as co-fired microwave components (iv) for electrodes for Fuel cells (v) as catalyst (solid photocatalysts, oxidation catalysts) (vi) as gas monitoring sensors. (vii) as possible host for radioactive wastes, and (iii) as host for fluorescence centers.

The details of the present invention are described in the examples given below.

These examples are provided by way of illustration only and should not be construed to limit the scope of the invention.

Accordingly, the present invention provides novel compounds of the general formula $Mg_2MM'O_{6+x}$ where M=Y, La or a rare earth metal, M'=Sn, Sb, Zr and Ta, $0.5<x<0.5$ having pyrochlore structure, wherein minor variations in the compositions up to 8%, in any of the metal ions is tolerated for the formation of the required phase, and, a process for the preparation of the said novel compounds comprising:

(i) Mixing the compounds of magnesium, M and M' (where M=Y, La or a rare earth metal, M'=Sn, Sb, Zr and Ta) in such a way as to get the molar ratio of Mg:M:M' as 2:1:1 required for the formation of the compounds of the general formula $Mg_2MM'O_{6+x}$, wherein minor variations in the compositions up to 8% in any of metal ion is tolerated for the formation of the required phase;

(ii) the mixture obtained in step (i) is ball milled or mixed with a wetting medium;

(iii) the resultant ball milled slurry obtained is dried to remove the liquid and obtain dry powder:

(iv) Heating the resultant mixture to a temperature in the range 1000-1600° C. as required for different duration ranging from 3 hour to 50 hours, either in a single step or by taking out the reactant after few hours of heating, checking for phase formation and heating it again after grinding if necessary, up to a maximum of 5 intermediate grindings may be required.

In an embodiment of the present invention, the compounds employed in the process are selected from their oxides, carbonates chlorides, alkoxides, nitrates, sulfates etc. and preferably the salts used are selected from oxides or carbonate.

In another embodiment of the present invention the wetting medium used in the process is selected from water, alcohol, acetone or any other organic solvent.

In another embodiment of the present invention, novel compound obtained is of the formula $Mg_2SmTaO_6$ as nanoparticle having pyrochlore structure wherein minor variation in the compositions up to 8% in any of the metal ions is tolerated for the formation of the phase.

In still another embodiment of the present invention, novel compound obtained is of the formula $Mg_2NdTaO_6$ as nanoparticle having pyrochlore structure wherein minor variation in the compositions up to 8% in any of the metal ions is tolerated for the formation of the phase.

In yet another embodiment of the present invention, novel compound obtained is of the formula $Mg_2DyTaO_6$ as nanoparticle having pyrochlore structure wherein minor variation in the compositions up to 8% in any of the metal ions is tolerated for the formation of the phase.

In yet another embodiment of the present invention, novel compound obtained is of the formula $Mg_2PrTaO_6$ as nanoparticle having pyrochlore structure wherein for the formation of the phase.

In yet another embodiment of the present invention, novel compound obtained is of the formula $Mg_2GdTaO_6$ as nanoparticle having pyrochlore structure wherein minor variation in the compositions up to 8% in any of the metal ions is tolerated for the formation of the phase.

In still another embodiment of the present invention, novel compound obtained is of the formula $Mg_2EuTaO_6$ as nanoparticle having pyrochlore structure wherein minor variation in the compositions up to 8% in any of the metal ions is tolerated for the formation of the phase.

In still another embodiment of the present invention, novel compound obtained is of the formula $Mg_2LaTaO_6$ as nanoparticle having pyrochlore structure wherein minor variation in the compositions up to 8% in any of the metal ions is tolerated for the formation of the phase.

In further embodiment of the present invention, novel compound obtained is of the formula $Mg_2DySbO_6$ as nanoparticle having pyrochlore structure wherein minor variation in the compositions up to 8% in any of the metal ions is tolerated for the formation of the phase.

In further embodiment of the present invention, novel compound obtained is of the formula $Mg_2SmZrO_{5.5}$ as nanoparticle having pyrochlore structure wherein minor variation in the compositions up to 8% in any of the metal ions is tolerated for the formation of the phase.

In still further embodiment of the present invention, novel compound obtained is of the formula $Mg_2NdZrO_{5.5}$ as nanoparticle having pyrochlore structure wherein minor variation in the compositions up to 8% in any of the metal ions is tolerated for the formation of the phase.

In still embodiment of the present invention, novel compound obtained is of the formula $Mg_2DyZrO_{5.5}$ as nanoparticle having pyrochlore structure wherein minor variation in the compositions up to 8% in any of the metal ions is tolerated for the formation of the phase.

In yet further embodiment of the present invention, novel compound obtained is of the formula $Mg_2LaSnO_{5.5}$ as nanoparticle having pyrochlore structure wherein minor variation in the compositions up to 8% in any of the metal ions is tolerated for the formation of the phase.

In yet further embodiment of the present invention, novel compound obtained is of the formula $Mg_2GdZrO_{5.5}$ as nanoparticle having pyrochlore structure wherein minor variation in the compositions up to 8% in any of the metal ions is tolerated for the formation of the phase.

In still another embodiment of the present invention, novel compound obtained is of the formula $Mg_2EuZrO_{5.5}$ as nanoparticle having pyrochlore structure wherein minor variation in the compositions up to 8% in any of the metal ions is tolerated for the formation of the phase.

In yet another embodiment of the present invention, novel compound obtained is of the formula $Mg_2LaZrO_{5.5}$ as nanoparticle having pyrochlore structure wherein minor variation in the compositions up to 8% in any of the metal ions is tolerated for the formation of the phase.

In still further embodiment of the present invention, novel compound obtained is of the formula $Mg_2PrZrO_{5.5}$ as nanoparticle having pyrochlore structure wherein minor variation in the compositions up to 8% in any of the metal ions is tolerated for the formation of the phase.

EXAMPLE-1

Magnesium Samarium Tantalate ($Mg_2SmTaO_6$)

Figure 1:
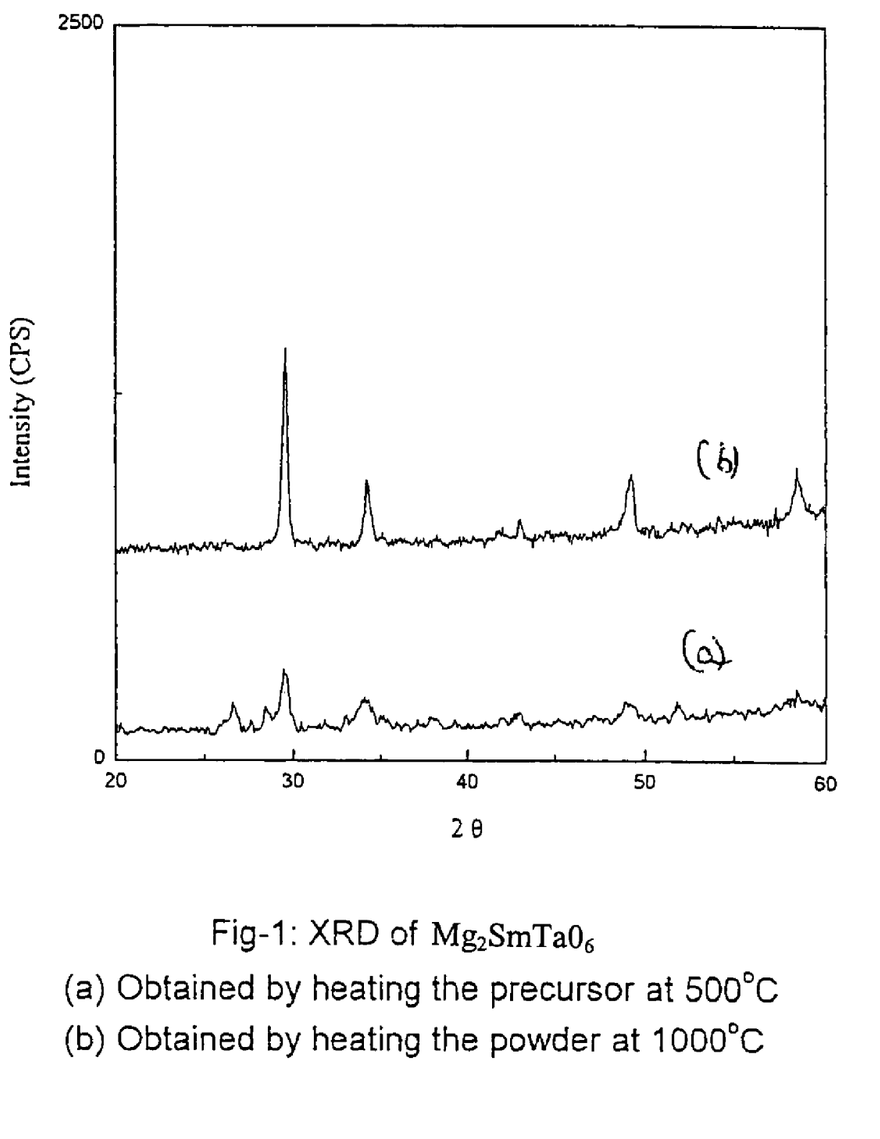
FIG. 1 shows the XRD pattern of $Mg_2SmTaO_6$.
Figure 2:
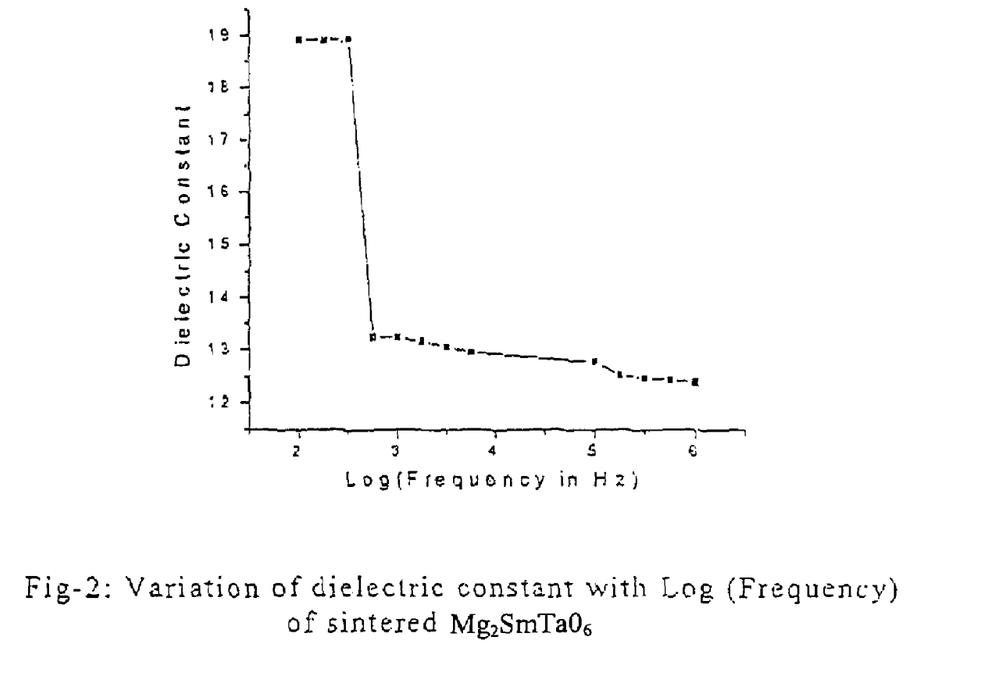
FIG. 2 shows the variation of dielectric constant with Log (Frequency) of sintered $Mg_2SmTaO_6$.
Figure 3:
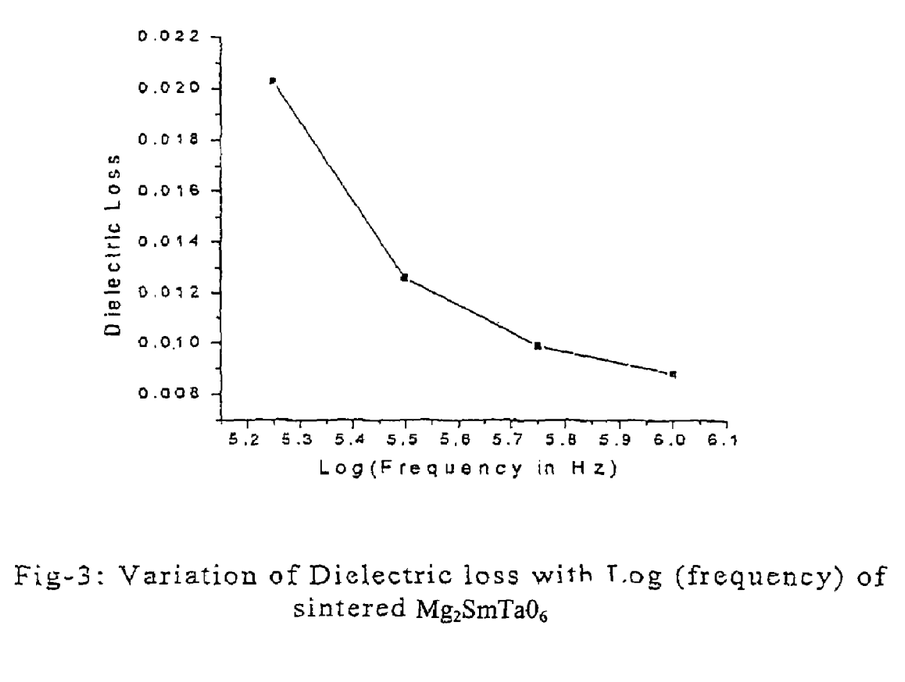
FIG. 3 shows the variation of Dielectric loss with Log (Frequency) of sintered $Mg_2SmTaO_6$.

Magnesium Samarium Tantalate ($Mg_2SmTaO_6$), for example, is obtained by;
(i) Taking four gram molecular weight of Magnesium Carbonate ($MgCO_3$), one gram molecular weight of Samarium Oxide ($Sm_2O_3$), and one gram molecular weight of Tantalum oxide ($Ta_2O_5$)
(ii) Mixing these three reactants by ball milling the mixture for 24 hours using water as the wetting medium.
(iii) Drying the ball milled reaction mixture (sample) in an oven at about 120° C.
(iv) Pelletizing the sample and heating at 1400° C. for 10 hours with three intermediate grinding.
(v) The XRD pattern of this compound is shown in FIG. 1.
(vi) Considering the highest possible oxidation states of the metals used; (Mg—+2, Sm—+3 and Ta—+5) the chemical formula of the compound Magnesium Samarium Tantalate is worked out to be $Mg_2SmTaO_6$.
(vii) The variation of dielectric constant and loss factor of the compound $Mg_2SmTaO_6$ is shown in FIG. 2 and FIG. 3. This clearly shows that the compound is suitable for use as electronic ceramic material for all applications where the dielectric constant plays a crucial role. E.g. substrate for superconductors.
(viii) The compound does not show any phase transition on heating up to 1300° C.

EXAMPLE-2

Magnesium Lanthanum Stanate ($Mg_2LaSnO_{5.5}$)

Figure 4:
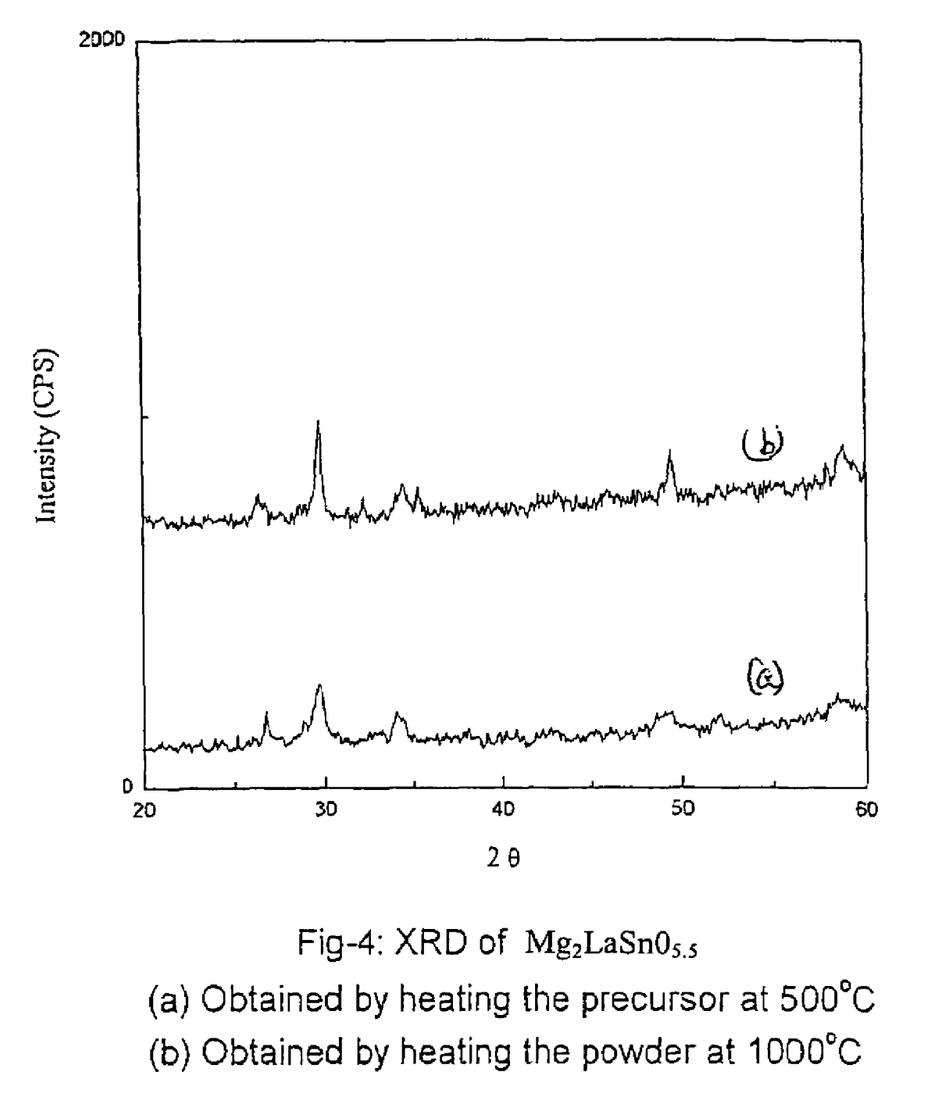
FIG. 4 shows the XRD pattern of $Mg_2LaSnO_{5.5}$.
Figure 5:
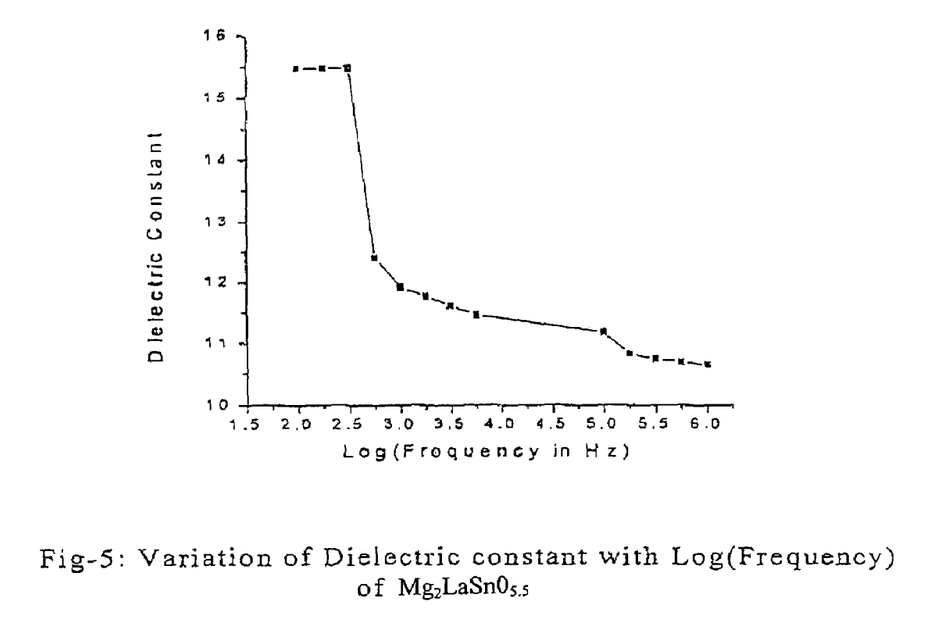
FIG. 5 shows the variation of dielectric constant with Log (Frequency) of $Mg_2LaSnO_{5.5}$.
Figure 6:
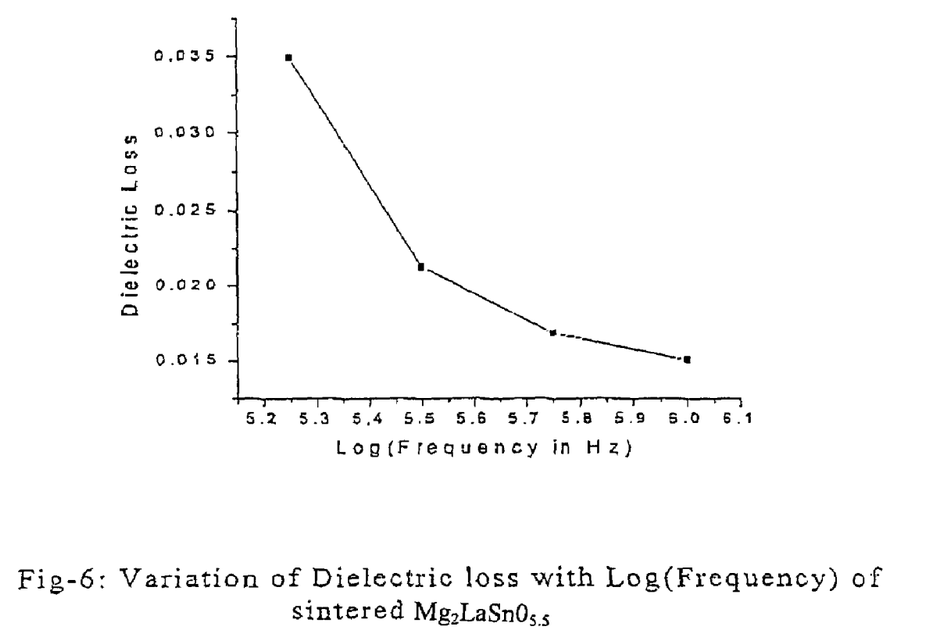
FIG. 6 shows the variation of dielectric loss Log (Frequency) of sintered $Mg_2LaSnO_{5.5}$.

Magnesium Lanthanum Stanate ($Mg_2LaSnO_{5.5}$), for example, is obtained by;
(i) Taking four gram molecular weight of Magnesium Carbonate ($MgCO_3$), one gram molecular weight of lantanum oxide ($La_2O_3$), and one gram molecular weight of Tin oxide ($SnO_2$)
(ii) Mixing these three reactants by ball milling the mixture for 12 hours using water as the wetting medium.
(iii) Drying the ball milled reaction mixture (sample) in an oven at about 120° C.
(iv) Pelletizing the sample and heating at 1450° C. for 10 hours with one intermediate grinding.
(v) The XRD pattern of this compound is shown in FIG. 4
(vi) Considering the highest possible oxidation states of the metals used; (Mg—+2, La—+3 and Sn—+4) the chemical formula of the compound Magnesium lanthanum Stannate is worked out to be $(Mg_2LaSnO_{5.5})$, (vii) The variation of dielectric constant and loss factor of the compound $Mg_2LaSnO_{5.5}$ is shown in FIG. 5 and FIG. 6. This clearly shows that the compound is suitable for use as electronic ceramic material for all applications where dielectric constant and loss factor play an important role. E.g. as substrate for superconductors.

(viii) The compound does not show any phase transition on heating up to 1300° C.

EXAMPLE-3

Magnesium Dysprosium Antimonate $(Mg_2DySbO_6)$

Magnesium Dysprosium Antimonate $(Mg_2DySbO_6)$, for example, is obtained by;

(i) Taking four gram molecular weight of Magnesium Carbonate $(MgCO_3)$, one gram molecular weight of dysprosium oxide $(Dy_2O_3)$, and one gram molecular weight of antimony pentoxide $(Sb_2O_5)$ (ii) Mixing these three reactants by ball milling the mixture for 18 hours using water as the wetting medium.

(iii) Drying the ball milled reaction mixture (sample) in an oven at about 120° C.

(iv) Pelletizing the sample and heating at 1550° C. for 10 hours with one intermediate grinding.

Figure 7:
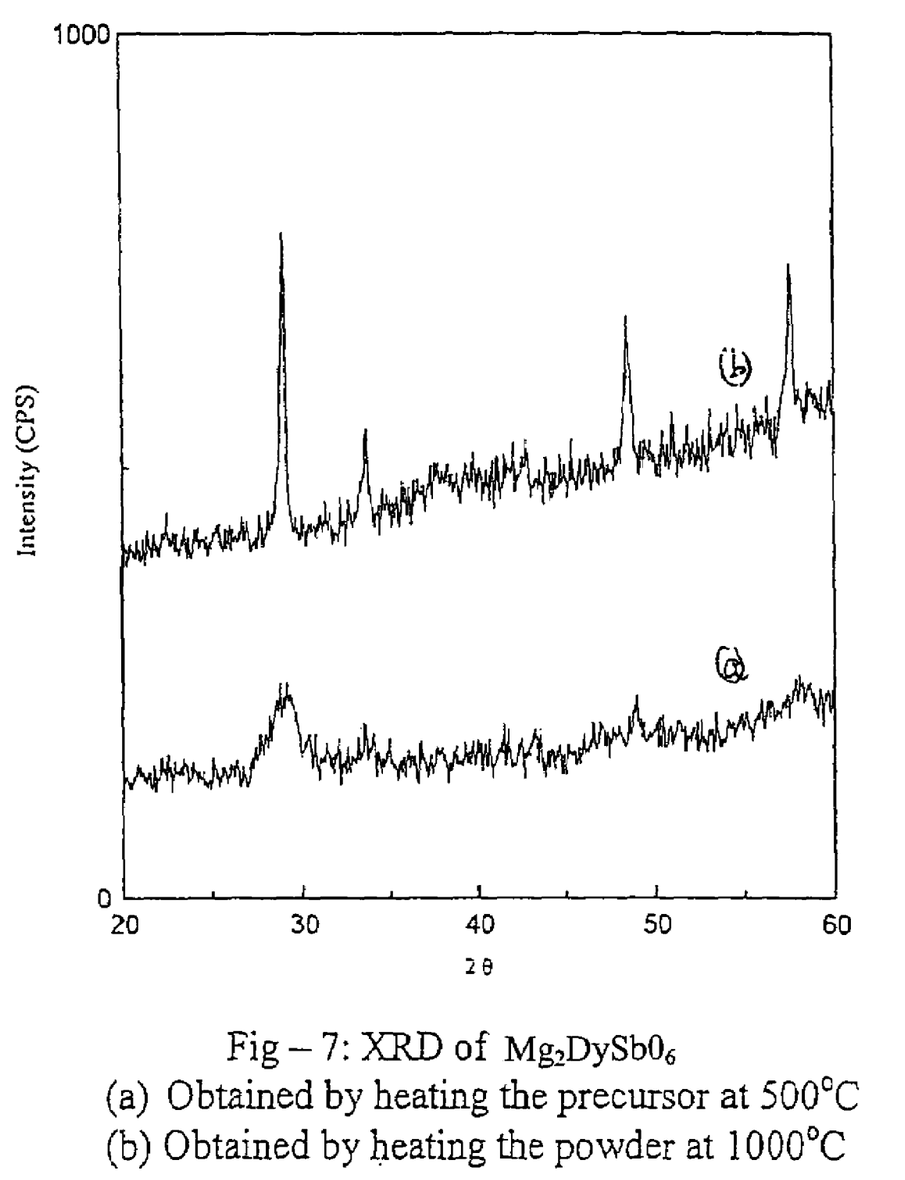
FIG. 7 shows the XRD pattern of $Mg_2DySbO_6$.

(v) The XRD pattern of this compound is shown in FIG. 7

Figure 8:
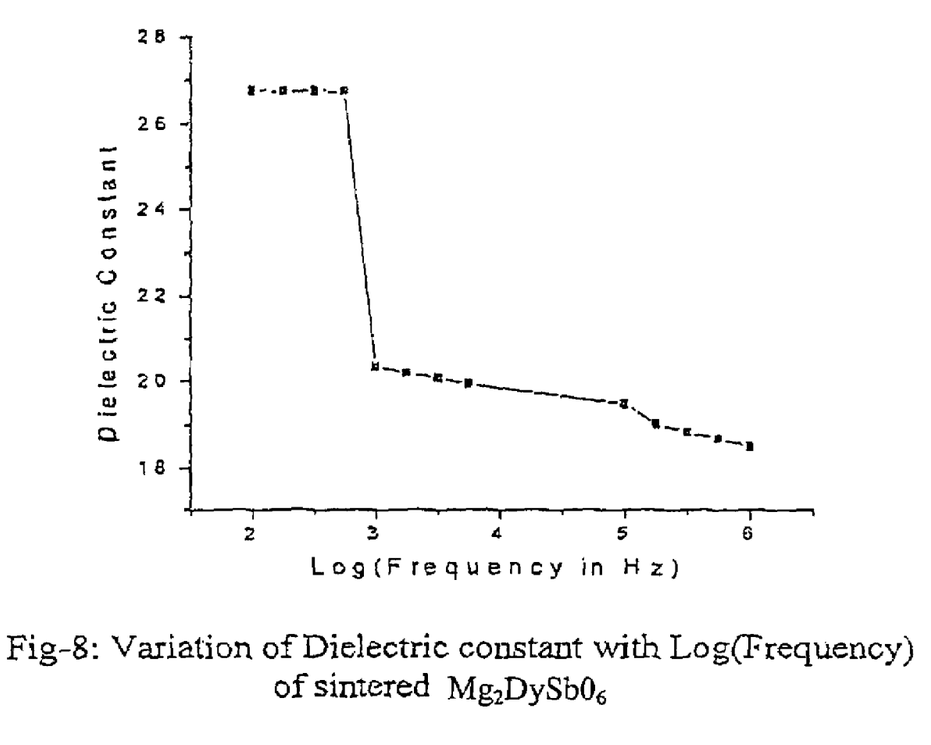
FIG. 8 shows the variation of dielectric constant with Log (Frequency) of sintered $Mg_2DySbO_6$.
Figure 9:
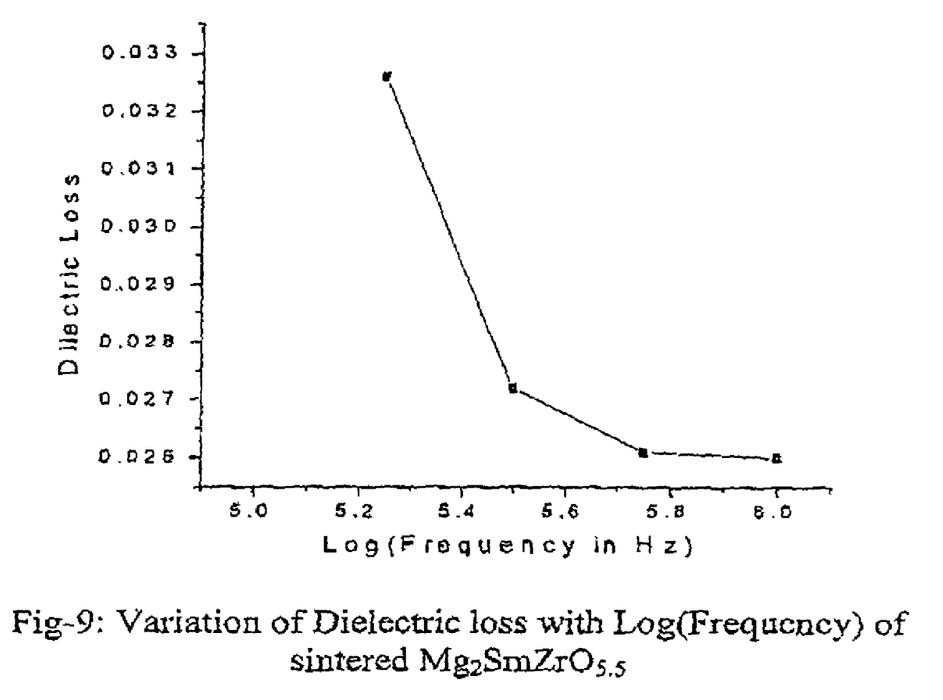
FIG. 9 shows the variation of Dielectric loss with Log (Frequency) of sintered $Mg_2DySbO_6$.
Figure 10:
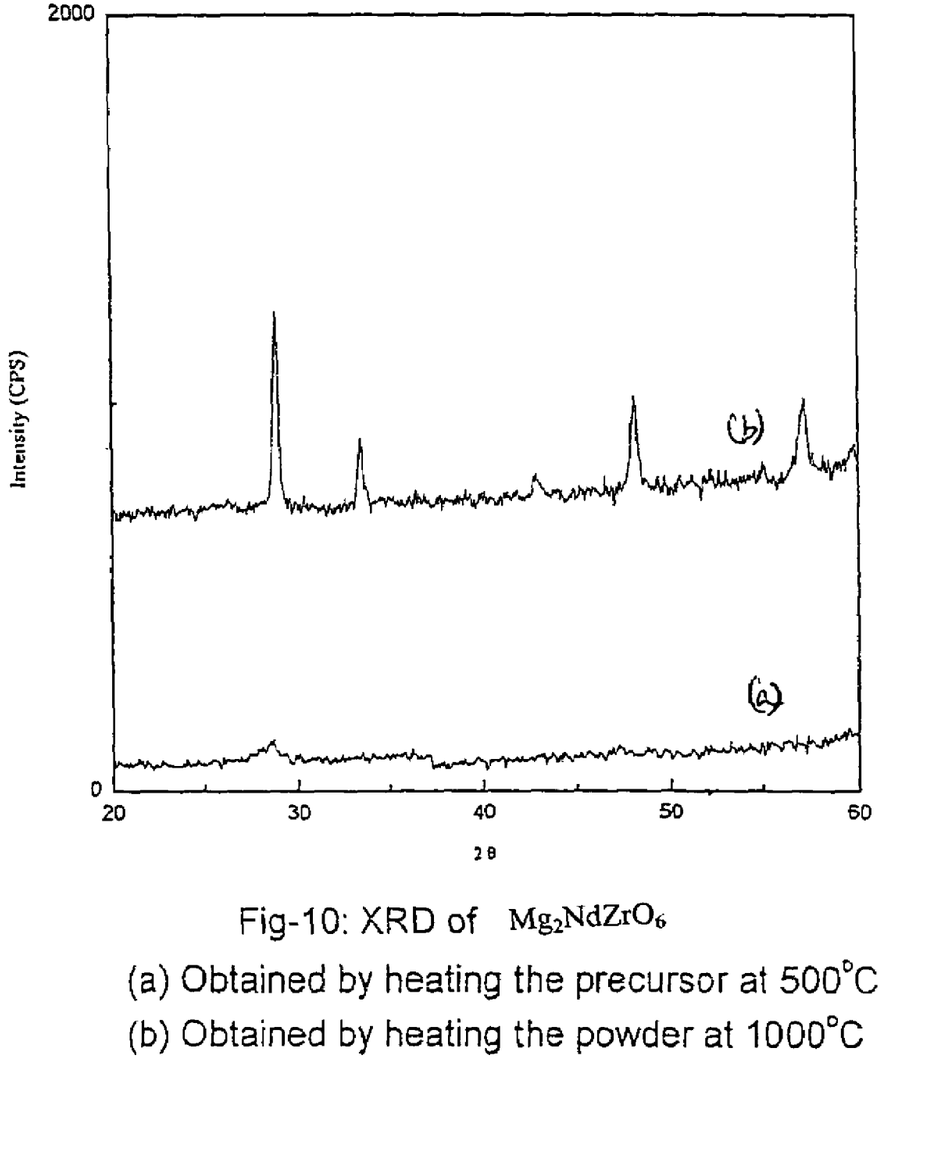
FIG. 10 shows the XRD pattern of $Mg_2NdZrO_6$.
Figure 11:
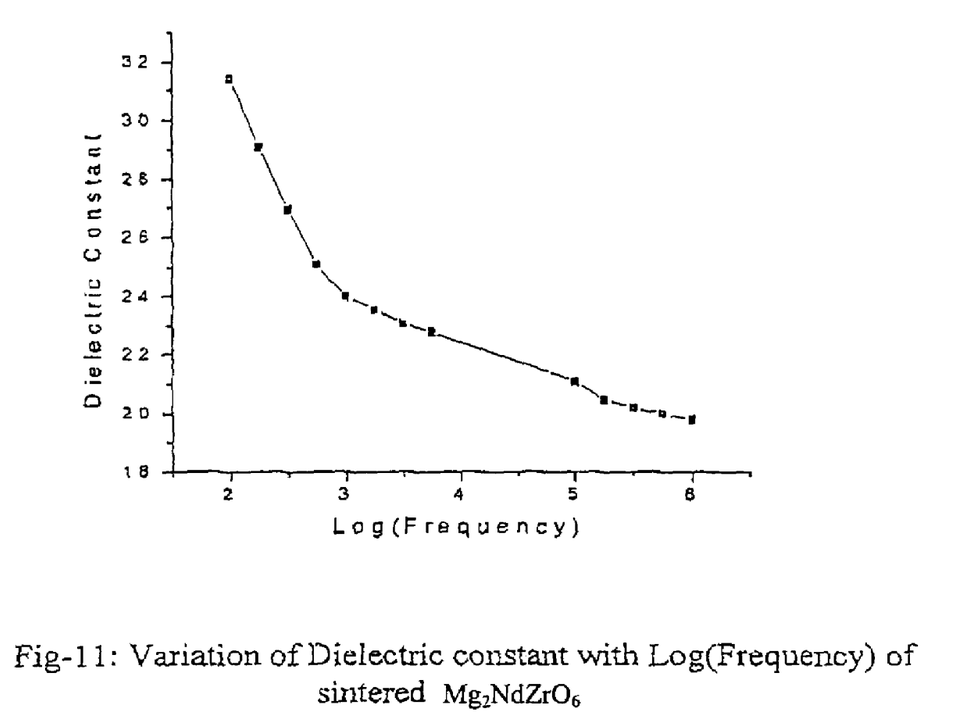
FIG. 11 shows the variation of dielectric constant with Log (Frequency) of sintered $Mg_2NdZrO_6$.
Figure 12:
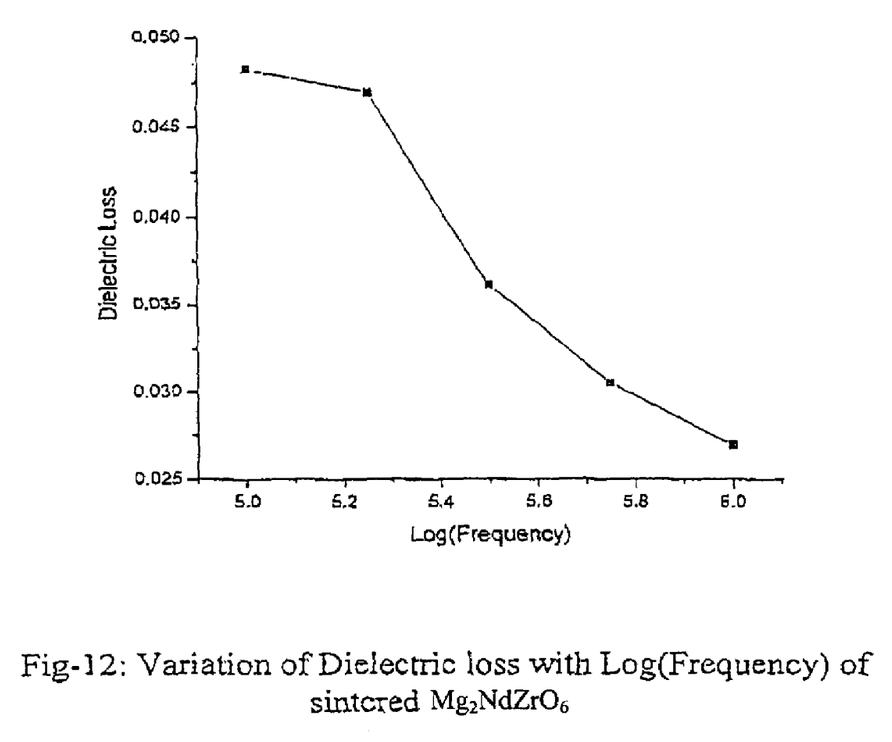
FIG. 12 shows the variation of dielectric loss with Log (Frequency) of sintered $Mg_2NdZrO_6$.

(vi) Considering the highest possible oxidation states of the metals used, (Mg—+2, Dy—+3 and Sb—+5) the chemical formula of the compound Magnesium Dysprosium Antimonate is worked out to be $(Mg_2DySbO_6)$, (vii) The variation of dielectric constant and loss factor of the compound $Mg_2DySbO_6$ is shown in FIG. 8 and FIG. 9. This clearly shows that the compound is suitable for use in all electronic ceramic applications.

We claim:

1. Compounds of the general formula $Mg_2MM'O_{6+x}$ where M=Y, La or a rare earth metal, M'=Sn, Sb, Zr and Ta, having pyrochlore structure, where $-0.5<x<0.5$, wherein minor variations in the compositions up to 8%, in any of the metal ions is tolerated for the formation of the required structure.

2. Compounds as claimed in claim 1, of the formula $Mg_2SmTaO_6$ as nanoparticles, having pyrochlore structure wherein minor variation in the compositions up to 8% in any of the metal ions is tolerated for the formation of the structure.

3. Compounds as claimed in claim 1, of the formula $Mg_2NdTaO_6$ as nanoparticles, having pyrochlore structure wherein minor variation in the compositions up to 8% in any of the metal ions is tolerated for the formation of the structure.

4. Compounds as claimed in claim 1, of the formula $Mg_2DyTaO_6$ as nanoparticles, having pyrochlore structure wherein minor variation in the compositions up to 8% in any of the metal ions is tolerated for the formation of the structure.

5. Compounds as claimed in claim 1, of the formula $Mg_2PrTaO_6$ as nanoparticles, having pyrochlore structure wherein minor variation in the compositions up to 8% in any of the metal ions is tolerated for the formation of the structure.

6. Compounds as claimed in claim 1, of the formula $Mg_2GdTaO_6$ as nanoparticles, having pyrochlore structure wherein minor variation in the compositions up to 8% in any of the metal ions is tolerated for the formation of the structure.

7. Compounds as claimed in claim 1, of the formula $Mg_2EuTaO_6$ as nanoparticles, having pyrochlore structure wherein minor variation in the compositions up to 8% in any of the metal ions is tolerated for the formation of the structure.

8. Compounds as claimed in claim 1, of the formula $Mg_2LaTaO_6$ as nanoparticles, having pyrochlore structure wherein minor variation in the compositions up to 8% in any of the metal ions is tolerated for the formation of the structure.

9. Compounds as claimed in claim 1, of the formula $Mg_2DySbO_6$ as nanoparticles, having pyrochlore structure wherein minor variation in the compositions up to 8% in any of the metal ions is tolerated for the formation of the structure.

10. Compounds as claimed in claim 1, of the formula $Mg_2SmZrO_{5.5}$ as nanoparticles, having pyrochlore structure wherein minor variation in the compositions up to 8% in any of the metal ions is tolerated for the formation of the structure.

11. Compounds as claimed in claim 1, of the formula $Mg_2NdZrO_{5.5}$ as nanoparticles, having pyrochlore structure wherein minor variation in the compositions up to 8% in any of the metal ions is tolerated for the formation of the structure.

12. Compounds as claimed in claim 1, of the formula $Mg_2DyZrO_{5.5}$ as nanoparticles, having pyrochlore structure wherein minor variation in the compositions up to 8% in any of the metal ions is tolerated for the formation of the structure.

13. Compounds as claimed in claim 1, of the formula $Mg_2LaSnO_{5.5}$ as nanoparticles, having pyrochlore structure wherein minor variation in the compositions up to 8% in any of the metal ions is tolerated for the formation of the structure.

14. Compounds as claimed in claim 1, of the formula $Mg_2GdZrO_{5.5}$ as nanoparticles, having pyrochlore structure wherein minor variation in the compositions up to 8% in any of the metal ions is tolerated for the formation of the structure.

15. Compounds as claimed in claim 1, of the formula $Mg_2EuZrO_{5.5}$ as nanoparticles, having pyrochlore structure wherein minor variation in the compositions up to 8% in any of the metal ions is tolerated for the formation of the structure.

16. Compounds as claimed in claim 1, of the formula $Mg_2LaZrO_{5.5}$ as nanoparticles, having pyrochlore structure wherein minor variation in the compositions up to 8% in any of the metal ions is tolerated for the formation of the structure.

17. Compounds as claimed in claim 1, of the formula $Mg_2PrZrO_{5.5}$ as nanoparticles, having pyrochlore structure wherein minor variation in the compositions up to 8% in any of the metal ions is tolerated for the formation of the structure.

18. A process for the preparation of the class of compounds as claimed in claim 1, which comprises:

(i) mixing the compounds of magnesium, M and M' (where M=Y, La or a rare earth metal, M'=Sn, Sb, Zr and Ta) in such a way as to get the molar ratio of Mg:M:M' as 2:1:1 required for the formation of the required structure;

(ii) the mixture obtained in step (i) is ball milled together with a wetting medium;
(iii) the resultant ball milled slurry obtained is dried to remove the liquid and obtain a dry powder;
(iv) pelletizing the dry powder and heating it to a temperature in the range of 1000-1600° C. as required for different durations ranging from 3 hours to 50 hours, either in a single step or by taking out the reactant after heating, checking for phase formation and heating it again after grinding if necessary, up to a maximum of 5 such grindings may be required.

19. A process as claimed in claim 18, wherein the compounds employed in step (i) are selected from the group consisting of their oxides, carbonates chlorides, alkoxides, nitrates, and sulfates.

20. A process as claimed in claim 18, wherein the wetting medium used in step (ii) is selected from water, alcohol, or acetone.

21. A process as claimed in claim 18 for the preparation of compounds of the formula $Mg_2SmTaO_6$ as nanoparticles, having pyrochlore structure wherein minor variation in the compositions up to 8% in any of the metal ions is tolerated for the formation of the structure.

22. A process as claimed in claim 18 for the preparation of compounds of the formula $Mg_2NdTaO_6$ as nanoparticles, having pyrochlore structure wherein minor variation in the compositions up to 8% in any of the metal ions is tolerated for the formation of the structure.

23. A process as claimed in claim 18 for the preparation of compounds of the formula $Mg_2DyTaO_6$ as nanoparticles, having pyrochlore structure wherein minor variation in the compositions up to 8% in any of the metal ions is tolerated for the formation of the structure.

24. A process as claimed in claim 18 for the preparation of compounds of the formula $Mg_2PrTaO_6$ as nanoparticles, having pyrochlore structure wherein minor variation in the compositions up to 8% in any of the metal ions is tolerated for the formation of the structure.

25. A process as claimed in claim 18 for the preparation of compounds of the formula $Mg_2GdTaO_6$ as nanoparticles, having pyrochlore structure wherein minor variations in the compositions up to 8% in any of the metal ions is tolerated for the formation of the structure.

26. A process as claimed in claim 18 for the preparation of compounds of the formula $Mg_2EuTaO_6$ as nanoparticles, having pyrochlore structure wherein minor variations in the compositions up to 8% in any of the metal ions is tolerated for the formation of the structure.

27. A process as claimed in claim 18 for the preparation of compounds of the formula $Mg_2LaTaO_6$, as nanoparticles, having pyrochlore structure wherein minor variations in the compositions up to 8% in any of the metal ions is tolerated for the formation of the structure.

28. A process as claimed in claim 18 for the preparation of compounds of the formula $Mg_2DySbO_6$ as nanoparticles, having pyrochlore structure, wherein minor variations in the compositions up to 8% in any of the metal ions is tolerated for the formation of the structure.

29. A process as claimed in claim 18 for the preparation of compounds of the formula $Mg_2SmZrO_{5.5}$ as nanoparticles, having pyrochlore structure, wherein minor variations in the compositions up to 8% in any of the metal ions is tolerated for the formation of the structure.

30. A process as claimed in claim 18 for the preparation of compounds of the formula $Mg_2NdZrO_{5.5}$ as nanoparticles, having pyrochlore structure, wherein minor variations in the compositions up to 8% in any of the metal ions is tolerated for the formation of the structure.

31. A process as claimed in claim 18 for the preparation of compounds of the formula $Mg_2DyZrO_{5.5}$ as nanoparticles, having pyrochlore structure, wherein minor variations in the compositions up to 8% in any of the metal ions is tolerated for the formation of the structure.

32. A process as claimed in claim 18 for the preparation of compounds of the formula $Mg_2LaSnO_{5.5}$ as nanoparticles, having pyrochlore structure, wherein minor variations in the compositions up to 8% in any of the metal ions is tolerated for the formation of the structure.

33. A process as claimed in claim 18 for the preparation of compounds of the formula $Mg_2GdZrO_{5.5}$ as nanoparticles, having pyrochlore structure, wherein minor variations in the compositions up to 8% in any of the metal ions is tolerated for the formation of the structure.

34. A process as claimed in claim 18 for the preparation of compounds of the formula $Mg_2EuZrO_{5.5}$ as nanoparticles, having pyrochlore structure, wherein minor variations in the compositions up to 8% in any of the metal ions is tolerated for the formation of the structure.

35. A process as claimed in claim 18 for the preparation of compounds of the formula $Mg_2LaZrO_{5.5}$ as nanoparticles, having pyrochlore structure, wherein minor variations in the compositions up to 8% in any of the metal ions is tolerated for the formation of the structure.

36. A process as claimed in claim 18 for the preparation of compounds of the formula $Mg_2PrZrO_{5.5}$ as nanoparticles, having pyrochlore structure, wherein minor variations in the compositions up to 8% in any of the metal ions is tolerated for the formation of the structure.

* * * * *